US012784180B2

(12) United States Patent
Tschentscher et al.

(10) Patent No.: US 12,784,180 B2
(45) Date of Patent: Nov. 3, 2026

(54) METHOD FOR ASSESSING A COMPONENT QUALITY OF AN ELECTRON EMITTER

(71) Applicant: Siemens Healthineers AG, Forchheim (DE)

(72) Inventors: Malte Tschentscher, Bamberg (DE); Andreas Selmaier, Erlangen (DE); Brian Da Silva Teixeira, Princeton, NJ (US); Ankur Kapoor, Plainsboro, NJ (US); Vivek Singh, Princeton, NJ (US); Florian Holch, Nuremberg (DE); Patrick Luehring, Hoechstadt (DE); Michael Wiessner, Wiesentheid (DE)

(73) Assignee: SIEMENS Healthineers AG, Erlangen (DE)

( * ) Notice: Subject to any disclaimer, the term of this patent is extended or adjusted under 35 U.S.C. 154(b) by 293 days.

(21) Appl. No.: 18/597,087

(22) Filed: Mar. 6, 2024

(65) Prior Publication Data

US 2024/0303803 A1 Sep. 12, 2024

(30) Foreign Application Priority Data

Mar. 8, 2023 (EP) .................................... 23160792

(51) Int. Cl.
*G06T 7/00* (2017.01)
*G06T 7/60* (2017.01)
*G06V 10/74* (2022.01)

(52) U.S. Cl.
CPC ................ *G06T 7/001* (2013.01); *G06T 7/60* (2013.01); *G06V 10/761* (2022.01); *G06T 2207/20081* (2013.01); *G06T 2207/20084* (2013.01)

(58) Field of Classification Search
CPC .......... G06T 7/001; G06T 7/60; G06V 10/761
USPC .......................................................... 382/152
See application file for complete search history.

(56) References Cited

U.S. PATENT DOCUMENTS

| | | | | |
|---|---|---|---|---|
| 6,036,564 | A * | 3/2000 | Scholten | H01J 9/42 445/64 |
| 11,633,163 | B2 * | 4/2023 | De Man | A61B 6/032 378/7 |
| 2015/0076988 | A1 * | 3/2015 | Plettner | H01J 37/285 977/939 |
| 2017/0236677 | A1 * | 8/2017 | Tirén | B03C 3/47 96/74 |
| 2018/0047156 | A1 * | 2/2018 | Rudin | A61B 6/032 |
| 2019/0122913 | A1 * | 4/2019 | Lauber | G03F 7/7065 |
| 2022/0359148 | A1 * | 11/2022 | Jud | H01J 35/065 |
| 2023/0335365 | A1 * | 10/2023 | Bennett | H01J 29/96 |
| 2024/0054632 | A1 * | 2/2024 | Yu | G06T 7/001 |

FOREIGN PATENT DOCUMENTS

| | | | |
|---|---|---|---|
| EP | 4006840 | A1 | 6/2022 |
| JP | H0729494 | A | 1/1995 |
| JP | 2002324495 | A | 11/2002 |
| WO | WO 9953515 | A1 | 10/1999 |

* cited by examiner

*Primary Examiner* — William D Titcomb
(74) *Attorney, Agent, or Firm* — Harness, Dickey & Pierce, P.L.C.

(57) ABSTRACT

One or more example embodiments of the present invention relates to a computer-implemented method for assessing a component quality of an electron emitter as a function of an ascertained degree of similarity with at least one further electron emitter.

20 Claims, 3 Drawing Sheets

METHOD FOR ASSESSING A COMPONENT QUALITY OF AN ELECTRON EMITTER

CROSS-REFERENCE TO RELATED APPLICATION (S)

The present application claims priority under 35 U.S.C. § 119 to European Patent Application No. 23160792.0, filed Mar. 8, 2023, the entire contents of which is incorporated herein by reference.

FIELD

One or more example embodiments of the present invention relates to a computer-implemented method for assessing a component quality of an electron emitter, to a computer-implemented method for training a machine learning method for assessing a component quality of an electron emitter, to an associated AI model, to an associated cathode facility and to an associated computer program product.

RELATED ART

An electron emitter is conventionally inserted in an X-ray tube. Free electrons are generated via the electron emitter, and these can be accelerated, for example, towards an anode. The electron emitters exist in different designs. The electron emitters can typically be divided into two categories: into thermionic emitters and cold emitters.

With thermionic emission of electrons, the electron emitter is at least partially heated until electrons issue from the heated emitter region. A conventional thermionic emitter is, for example, a coiled emitter. An alternative to this is the flat emitter. A conventional flat emitter typically consists of an emitter sheet. The emitter sheet is customarily structured with incisions.

A cold emitter is, for example, a field effect emitter and typically has a large number of emitter pins. An electron current can be extracted from the tips of the emitter pins by applying a gate voltage using the field effect.

Deformations can occur, in particular with thermionic electron emitters, as a consequence of the thermal load during electron emission. These deformations are, for example, a C-deformation, an S-deformation or a deformation with a different shape. One abnormal deformation is, in particular, an artifact in the geometry of the electron emitter, which adversely affects a component quality and can thus be a quality-critical parameter. Ideally the electron emitter geometry is artifact-free. The component quality can correlate, in particular, with the life of a component.

To be able to assess the component quality, it is preferable, in particular, to link the electron emitter geometry of the electron emitter to performance data, obtained in the field, of comparable electron emitters. Typically, the electron emitter geometry has to be comprehensively parametrized for this. The electron emitter geometry describes, in particular, a positioning of the electron emitter inserted in a cathode head. Parameterization takes place, for example, with the aid of a measuring machine and/or requires, in particular, expensive automation, and, as a rule, this entails increased measuring times under atmospheric pressure. Dwell times under atmospheric pressure for vacuum components, as electron emitters are, have to be critically evaluated in the process. Assessing the component quality is complex and regularly exceeds the amount of information which can be acquired by a user of the electron emitter. The complexity of this assessment is based, in particular, on the fact that variances in the micrometer range have to be considered and/or there can be a strong dependence on the specific use of the electron emitter.

SUMMARY

There is currently no adequate tool for effective and/or standardized acquisition of the electron emitter geometry and/or for efficient assessment of the component quality, in particular with a view to a deformation and/or incorrect positioning of the electron emitter. The measurement of the electron emitter which customarily occurs merely selectively is frequently not sufficient for this purpose because, in particular, the selection of measuring points is critically determined deformations that are already known. By contrast, previously unknown deformations remain potentially undiscovered.

Acquiring the electron emitter geometry is conventionally based on acquiring a defined series of measuring points. Acquiring the electron emitter geometry is customarily restricted to those measuring points which characterize the outer gap of the emitter. Alternatively or in addition, the height of the electron emitter inserted in the cathode head relative to the cathode head is selectively measured. A positioning relative to the central bar is regularly not considered. Distances situated therebetween can typically be calculated from the measuring points. The electron emitter geometry is customarily captured via a manual measuring process, in particular in a manufacturing environment. To keep the manual acquisition effort low, frequently only a small number of measuring points is acquired. The measuring results based thereon can thus only provide a rough indicator of the electron emitter geometry. In particular, the conventional measuring results do not provide a comprehensive parameterization of the electron emitter.

The different types of deformations on, in particular thermionic, electron emitters can therefore regularly not be precisely mapped and/or differentiated. In particular, continuous linking of the acquired electron emitter geometry to performance data obtained in the field does not occur. In other words, the assessment of the component lifetime is conventionally triggered singly and/or only if required.

One or more example embodiments of the present invention is based on the object of disclosing a computer-implemented method for assessing a component quality of an electron emitter, a computer-implemented method for training a machine learning method for assessing a component quality of an electron emitter, an associated AI model, an associated cathode facility and an associated computer program product with an improved possibility of differentiation.

BRIEF DESCRIPTION OF THE DRAWINGS

One or more example embodiments of the present invention will be described and explained in more detail below with reference to exemplary embodiments represented in the figures. Basically, substantially unchanging structures and units will be labeled with the same reference numeral in the following description of the figures as when the respective structure or unit first appeared.

In the drawings.

DETAILED DESCRIPTION

Figure 1:
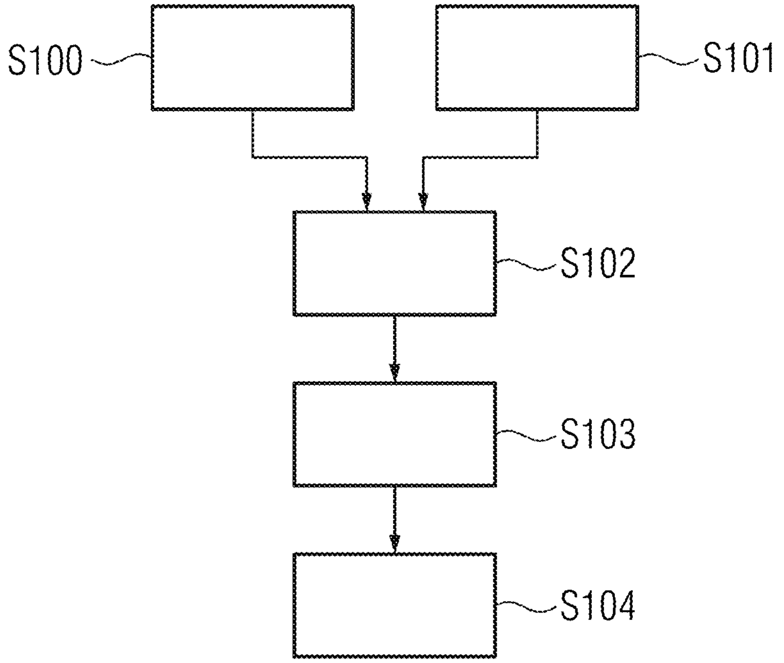
FIG. 1 shows an inventive computer-implemented method for assessing a component quality of an electron emitter.

The object is achieved by the features of the independent claims. Advantageous embodiments are described in the subclaims.

Independent of the grammatical term usage, individuals with male, female or other gender identities are included within the term.

An inventive computer-implemented method for assessing a component quality of an electron emitter, which is part of a cathode facility, wherein the cathode facility comprises a cathode head and the electron emitter inserted in the cathode head, wherein the electron emitter is, in particular, a flat emitter, comprises the following steps:

- receiving an electron emitter image dataset, wherein items of image information of the electron emitter image dataset at least partially map the electron emitter inserted in the cathode head,
- receiving an electron emitter geometry model from a memory unit,
- transforming the received electron emitter geometry model to the items of image information of the electron emitter image dataset, wherein an item of electron emitter geometry information of the electron emitter is calculated as an output parameter of the transformation,
- ascertaining a degree of similarity of the inserted electron emitter with at least one further electron emitter by using the electron emitter geometry information,
- assessing the component quality as a function of the ascertained degree of similarity with the at least one further electron emitter.

The component quality of the electron emitter corresponds, in particular, to a component lifetime of the electron emitter. Alternatively or in addition, the component quality of the electron emitter can correlate with the absence of a defect and/or an image quality achieved via generated X-ray radiation.

The component lifetime can be specified, in particular, in units of time and/or units of load. The unit of load can comprise, for example, a sum or establishment over time of an X-ray dose, a limit load and/or a heating current over the lifetime of the electron emitter. Performance data obtained in the field typically specifies units of time and/or units of load. At the end of the component lifetime, the electron emitter can typically no longer be operated in the framework of the specification and/or has to be replaced. The electron emitter can be operated in the framework of the specification within or up to the end of the component lifetime. In the framework of the specification means that performance data, obtained in the field, of the electron emitter lies within the limits defined in the specification.

The electron emitter is, in particular, a thermionic emitter. Alternatively it is conceivable that the electron emitter is a cold emitter, for example, a field effect emitter. The thermionic emitter is, in particular, a flat emitter which typically consists of an emitter sheet with incisions. The thermionic emitter can alternatively be a coiled emitter.

The cathode facility typically has a negative high voltage relative to an anode. Basically it is conceivable that the cathode facility is at ground potential. In this case, the cathode facility has a more negative high voltage compared to the anode. A high voltage is typically applied between the cathode facility and the anode. Basically the anode can be at ground potential.

Free electrons generated via the electron emitter are accelerated by the cathode facility, in particular via the high voltage, in the direction of the anode. The high voltage can in this case be called acceleration voltage, in particular. As the electrons interact on the anode, X-rays, in particular, are generated. Typically 99% of the kinetic energy of the accelerated electrons is converted into heat when the electrons strike the anode. The region in which the electrons strike is called, in particular, the focal spot.

To be able to cool the anode better, the anode can basically be rotatably arranged relative to the emitted electrons. When the anode rotates, the focal spot becomes part of a circular focal path. In this case, the anode is, for example, a rotating anode. An X-ray tube with such a rotating anode and cathode facility is differentiated, for example, to the extent to which the cathode facility rotates together with the anode or not. In the first case, the X-ray tube is, in particular, a rotary piston X-ray tube and in the latter case, the X-ray tube is, in particular, a rotary anode X-ray tube. If the anode is fixed, the X-ray tube is, in particular, a stationary anode X-ray tube. Alternatively it is conceivable that the cathode facility is arranged inside a linear acceleration unit.

The electrons accelerated via the acceleration voltage have an energy of up to 150 keV, in particular for diagnostic imaging and/or materials testing. Electrons accelerated via the linear acceleration unit can have an energy of up to 20 MeV for non-destructive imaging and/or materials testing and/or therapy. Depending on the energy of the electrons, the energy of the X-ray radiation is at most, for example, 150 keV or 20 MeV.

The cathode facility can consist of the cathode head and the electron emitter inserted in the cathode head. The cathode head can be configured for blocking the free electrons or for deflecting the free electrons. The electric potential of the cathode facility is applied, in particular, at the cathode head. The cathode head can be configured, in particular, for cooling the electron emitter. The cathode head and the electron emitter can be galvanically isolated and/or be electrically insulated from one another.

That the electron emitter is inserted in the cathode head can mean, in particular, that the electron emitter is terminally mounted in the cathode head. Terminally means that the assembly process of the cathode facility, in particular of the electron emitter in the cathode head, has already been fully run through. A positioning of the electron emitter relative to the cathode head is typically kept constant, for example via suitable fixing means, and/or can no longer be changed. For example, the electron emitter can be fixed relative to the cathode head via fixing means such as a screw, a spring, a bolt, a weld point and/or a solder point.

The electron emitter image dataset can be recorded, for example, via a sensor, in particular a camera and/or a scanner and/or a microscope and/or a white light interferometer. The sensor can be a 2D or 3D sensor. The electron emitter image dataset can comprise, in particular, 2D items of image information, in particular for describing a lateral extent and optionally also items of depth information.

The electron emitter image dataset can be a photo which contains the items of image information. The electron emitter image dataset can be a series of photos and/or a film. In addition, the electron emitter image dataset can contain metadata which describes the items of image information. The items of image information can include, in particular, gray scales, black-white or colors. The electron emitter image dataset is preferably stored in a digital data file, preferably in an image format. The electron emitter image dataset can correspond, in particular, to a digitized variant of an analog photo. The items of image information can be transformed into an image space or a frequency space. The items of image information can be in the form, for example, of items of raw information and/or items of final image information reworked, in particular, by the sensor.

The items of image information map the electron emitter at least partially, preferably completely. The items of image information preferably map, in particular, the electron emitter and the cathode head at least partially. It is conceivable that the items of image information map neither the entire electron emitter nor the entire cathode head. Basically it is conceivable that the items of image information do not map the cathode head at all.

The items of image information preferably map the electron emitter 1-to-1. Advantageously, the electron emitter does not appear distorted therefore in the items of image information. The items of image information preferably map the electron emitter in a rectified manner and/or so they are no longer distorted. It is conceivable that the items of image information no longer contain a distortion due to optics when recording the items of image information, but are corrected in this regard. For example, the reworked items of end image information are corrected in this way.

The electron emitter image dataset can be received, in particular, by the sensor and/or a memory unit. Receiving can comprise provision of the electron emitter image dataset by way of the sensor and/or the memory unit. The electron emitter image dataset is retrieved, for example, from a computing unit and subsequently received in the computing unit. Receiving the electron emitter image dataset can comprise transferring the electron emitter image dataset via an interface, which can be, in particular, a network interface.

Receiving the electron emitter image dataset can comprise reconstructing the items of image information and/or filtering the items of image information and/or annotating the items of image information. Reconstruction can comprise, in particular, applying an (inverse) Fourier transform to the items of image information. Filtering can comprise, in particular, region growing, edge smoothing, edge enhancement, image segmenting and/or contrasting of the items of image information. Annotating can comprise, in particular, placemark recognition and/or pattern recognition. Reconstructing and/or filtering and/or annotating can take place, for example, in the computing unit and/or in the sensor and/or in the memory unit. The memory unit can be part of the computing unit and/or the sensor.

Receiving the electron emitter geometry model can comprise querying the electron emitter geometry model from the memory unit. The electron emitter geometry model can be transferred, for example, via the interface.

The electron emitter geometry model corresponds, for example, to a 1-to-1 mapping of the or an electron emitter before insertion in the cathode head. In this case, the electron emitter geometry model maps, in particular, the or an electron emitter without deformation. The electron emitter geometry model shows, in particular, the or an electron emitter schematically and/or in an abstract manner.

Alternatively or in addition, it is conceivable that the electron emitter geometry model is adapted, for example starting from the 1-to-1 mapping, to acceptable deformations on the electron emitter, which can occur in the framework of insertion in the cathode head. The acceptable deformations can lie, in particular, in the framework of a specification and/or imperatively occur in the framework of the specification owing to the fixing means. The acceptable deformations are typically harmless and/or noncritical and/or immaterial to/for a quality and thus the component quality and/or component lifetime of the electron emitter. The 1-to-1 mapping can be adapted, for example, in that items of electron emitter geometry information of further electron emitters which have a comparatively high component quality and/or long component lifetimes are modelled and/or averaged. Preferably, the electron emitter geometry model can be adapted starting from this modeling and/or averaging.

The electron emitter geometry model is typically annotated with a large number of measuring points describing the electron emitter geometry. The electron emitter geometry model is annotated, for example, automatically and/or by a user. The measuring points can denote, in particular, an edge and/or a focal point and/or a center point.

Transforming the received electron emitter geometry model to the items of image information comprises, in particular, shifting at least one measuring point of the electron emitter geometry model to a measuring point mapped in the image information. If the electron emitter geometry model matches the items of image information 100% in respect of the geometry of if the electron emitter geometry model is identical in respect of the geometry to the items of image information, the output parameter is, for example, a 1-to-1 mapping. In this case, transforming does not comprise any shifting of at least one measuring point.

Transforming is, in particular, an image transformation. Transforming preferably takes place while minimizing a complex correlation factor. Transforming can comprise, in particular, a rigid and/or a non-rigid transformation. It is conceivable that the items of image information and/or the electron emitter geometry model are divided into different regions with a rigid transformation or a non-rigid transformation.

The output parameter is transformed and/or calculated, for example, in the computing unit, for example, via CPU or GPU. The output parameter is customarily calculated during transformation.

The electron emitter geometry information contains, in particular, a relationship of the items of image information to the electron emitter geometry model. The electron emitter geometry information denotes, in particular, a difference between the items of image information and the electron emitter geometry model. The electron emitter geometry information describes, in particular, the shift and/or the non-shift of the at least one measuring point. The electron emitter geometry information can describe, in particular, a spatial shift of at least one measuring point and/or one relative distance between two measuring points. The electron emitter geometry information is, for example, a transformation matrix. In the simplest variant, the transformation matrix corresponds to a 1-to-1 mapping and/or is equal to 1. In addition, the electron emitter geometry information can include the items of image information.

The electron emitter geometry information can comprise a classification of the items of image information in a relative category, such as not deformed, in particular 1-to-1 mapping, slightly deformed, highly deformed or not transformable, for example because it is too deformed, and/or a quantitative category, such as X deformations of the type Y.

Ascertaining the degree of similarity can comprise ascertaining the most similar electron emitter of the further electron emitters and/or defining the degree of similarity starting from the similarity between the most similar electron emitter and the electron emitters. Alternatively or in addition, the ascertained degree of similarity can be used, for example, to identify and/or select the most similar electron emitter of the further electron emitters. The degree of similarity is ascertained, in particular, in the computing unit.

Ascertaining the degree of similarity using the electron emitter geometry information means, in particular, that a comparison of the electron emitter geometry information with an item of electron emitter geometry information of the at least one further electron emitter takes place. Ascertaining the degree of similarity can comprise retrieving and/or receiving and/or providing the electron emitter geometry information of the at least one further electron emitter.

The degree of similarity can be ascertained with a plurality of electron emitters of the further electron emitters or with all further electron emitters. It is conceivable that the degree of similarity is ascertained multiple times with the same further electron emitter. Ascertaining the degree of similarity can comprise a ranking and/or filtering the degree of similarity. Ascertaining the degree of similarity can comprise categorizing the ascertained degrees of similarity and selecting a category with categorized degrees of similarity or a single degree of similarity of a category.

The degree of similarity is, in particular, a measure of the similarity. The degree of similarity describes, in particular, a similarity in relation to the items of electron emitter geometry information. Typically, the smaller the differences are between the electron emitter or the electron emitter geometry information of the electron emitter and the at least one further electron emitter or the electron emitter geometry information of the at least one further electron emitter, the higher the degree of similarity is.

The degree of similarity can be a correlation factor and/or a geometric mapping. The degree of similarity can be specified, for example, in “dissimilar” or “similar” categories. Alternatively or in addition, the degree of similarity can be a value between 0 and 100%. In this case, a threshold value, for example, can define a limit which separates similar and dissimilar electron emitters.

Assessing the component quality can correspond, in particular, to assessing the component lifetime. Assessing the component quality can be a calculation and/or ascertainment of the component quality. Assessing the component quality can comprise transferring the assessed component quality to the memory unit.

The component quality can be assessed, for example, in such a way that with a first degree of similarity, which is less than a second degree of similarity, a component quality of zero is assigned. In this case, for example, the electron emitter inserted in the cathode head has an abnormal deformation which lies outside of the specification and/or is unacceptable. The abnormal deformation can be, in particular, a serious deformation. In particular, a value corresponding to “deformed” and/or “defective” can be assigned to the inserted electron emitter.

Alternatively, with the second degree of similarity, the component quality can be assessed starting from an output value which is not affected by the at least one further electron emitter with the, in particular, highest degree of similarity. The output value can be based, for example, on performance data, obtained in the field, of the at least one further electron emitter or depend on this. The component quality can alternatively or additionally be assessed in such a way that the category with the at least one further electron emitter is selected and the performance data, obtained in the field, of those electron emitters of the selected category is used to form the output value. By way of example, the performance data obtained in the field can be averaged and/or modeled to form the output value. Alternatively, a component quality of the at least one further electron emitter can be extracted from the performance data obtained in the field and be provided as the assessed component quality.

Basically, the better the assessed performance data to be obtained in the field is or the better the performance data that is to be expected in the field is, the higher the assessment of the component quality and/or the longer the assessment of component lifetime will be. In other words, the less likely it is that the electron emitter will fail comparatively early and/or exhibit a defect and/or an artifact will occur, the higher the assessment of the component quality and/or the longer the assessment of the component lifetime will be. The poorer the performance data of the electron emitter that is to be expected in the field is, the lower or shorter the component quality or the component lifetime can be.

One embodiment provides that a single electron emitter image dataset is received and the component quality of the electron emitter is assessed via the single electron emitter image dataset of the electron emitter. This embodiment is advantageous, in particular, because assessing the component quality is simplified to the maximum as a result. This means that it is not a plurality of electron emitter image datasets that is received but only the one electron emitter image dataset.

One embodiment provides that the assessed component quality of the electron emitter is stored in the memory unit. This embodiment advantageously enables access to the assessed component quality, for example, during operation of the electron emitter.

One embodiment provides that ascertaining the degree of similarity comprises inputting the electron emitter geometry information into an AI model trained via a machine learning method, and providing the degree of similarity at an output of the AI model. The AI model can be advantageously used for ascertaining the degree of similarity if it is trained in accordance with the inventive training method. In this case, the AI model typically links a component quality and/or performance data obtained in the field to items of electron emitter geometry information. The linking in the AI model can be validated after the training. The AI model can be configured, in particular, for filtering the items of image information and/or for annotating the items of image information as previously described as an optional step when receiving the electron emitter image dataset. The AI model can be adapted, in particular, to the electron emitter geometry model. Ascertaining the degree of similarity can correspond to inputting the electron emitter geometry information into the AI model. The component quality can basically be assessed via the AI model.

One embodiment provides that the input electron emitter geometry information is dimensionally reduced via the AI model and the degree of similarity is ascertained via the dimensionally reduced electron emitter geometry information. In particular, a vector can be calculated for each electron emitter via the AI model, with the dimension of the vector being smaller than the number of items of performance data obtained in the field, with the dimension of the vector preferably being less than or equal to five, particularly preferably less than or equal to three. The dimension of the vector can be, in particular, equal to two and/or be greater than one.

In particular a dimensionally reduced information density distribution is generated via the AI model. The dimensionally reduced information density distribution is, in particular, an output parameter of the AI model and/or what is referred to as a “latent space” or “latent feature space” or “embedding space”. When generating the dimensionally reduced information density distribution, in particular the items of input data are linked with one another in such a way that input data that is irrelevant to differentiation is compressed in comparison to input data that is relevant to differentiation, and/or this data is removed. Input data that is relevant to differentiation enables, in particular, a demarcation and/or results in a larger abstract distance between the electron emitters. Input data that is irrelevant to differentiation can be a designation of the electron emitter and/or a generally applicable item of technical information. Input data that is relevant to differentiation can be, in particular, the items of electron emitter geometry information assigned to the selected component and the items of electron emitter geometry information of other components, which can be linked, in particular, to the performance data obtained in the field.

It is conceivable that the AI model processes only input data that is relevant to differentiation and filters out and/or discards input data that is irrelevant to differentiation. A non-binary, for example linear, weighting of the input data between relevant to differentiation and irrelevant to differentiation can preferably take place via the AI model. In particular, items of electron emitter geometry information and/or performance data, obtained in the field, of different electron emitters can be linked by applying the AI model.

The AI model enables, in particular, an extrapolation or an interpolation of scattered input data in particular. When applying the AI model, the number of items of input data is customarily reduced in such a way that the dimensionally reduced information density distribution is and/or can be visualized, for example, two-dimensionally or three-dimensionally. A user can consequently ascertain and/or perceive differences in the electron emitter geometry as (previously what were referred to as abstract) distances between the dimensionally reduced input data. Basically it is conceivable that the distances between the dimensionally reduced input data are automatically ascertained. The AI model is, in particular, trained in such a way that the more similar the input data that is relevant to differentiation of those electron emitters is, the closer together they are in the information density distribution.

One embodiment provides that via the AI model, a first category with electron emitter geometries with an artifact are distanced from a second category with electron emitter geometries without artifact and that the degree of similarity is ascertained via an assignment of the electron emitter geometry information to the first category or the second category. This embodiment describes, in particular, the categorization when ascertaining the degree of similarity. Basically it is conceivable that the AI model differentiates the categories according to number of and/or severity of the deformations. In particular, more than two categories are possible. Possible categories can be the classification corresponding to "not deformed", "acceptable deformations" and "abnormal deformations".

The inventive computer-implemented method for providing a trained AI model comprises the following steps:

receiving performance data, obtained in the field, of further electron emitters as input data, applying a neural network, which comprises an encoder and a decoder, to the input data, wherein an output vector is calculated, wherein the encoder maps a first number of input values to a second number of output values, and wherein the decoder maps a second number of input values to a first number of output values, wherein the second number is smaller than the first number, adapting a parameter of the neural network on the basis of a comparison of the output vector with the input data, outputting the decoder as a trained AI model.

One embodiment provides that, in addition, items of electron emitter geometry information of the further electron emitters are received as input data. This embodiment is advantageous, in particular, because the assessment of the component quality is consequently improved.

An inventive AI model is embodied for use for the inventive computer-implemented method. The AI model is trained, in particular, in accordance with the computer-implemented method for providing the trained AI model.

An inventive cathode facility has a cathode head and an electron emitter inserted in the cathode head, wherein a component quality of the electron emitter will be or is assessed with an inventive computer-implemented method for assessing a component quality of the electron emitter.

One embodiment provides that the electron emitter is a flat emitter. This embodiment is advantageous, in particular, because, owing to its rigidity, the flat emitter can have a tendency to deform and thus the component quality of the flat emitters can be inventively assessed.

The computer program product can be a computer program or comprise a computer program. The computer program product has, in particular, the program code means which map the inventive method steps. The inventive method can consequently be embodied in a defined and reproducible manner and control can be exercised over circulation of the inventive method. The computer program product is preferably configured in such a way that the computing unit can execute the inventive method steps via the computer program product. The program code means can be loaded, in particular, into a memory of the computing unit and can typically be executed via a processor of the computing unit with access to the memory. When the computer program product, in particular the program code means, is executed in the computing unit, typically all inventive embodiments of the described method can be carried out. The computer program product is saved, for example, on a physical, computer-readable medium and/or digitally stored in a computer network as a data packet. The computer program product can represent the physical, computer-readable medium and/or the data packet in the computer network. Thus one or more example embodiments of the present invention can also start from the physical, computer-readable medium and/or the data packet in the computer network. The physical, computer-readable medium can customarily be directly connected to the computing unit, for example, in that the physical, computer-readable medium is placed in a DVD drive or inserted in a USB port, whereby the computing unit has, in particular read, access to the physical, computer-readable medium. The data packet can preferably be retrieved from the computer network. The computer network can have the computing unit or be indirectly connected to the computing unit via a Wide Area Network (WAN) or a (Wireless) Local Area Network connection (WLAN or LAN). By way of example, the computer program product can be digitally stored on a Cloud server at a memory location of the computer network, be transferred via the WAN via the Internet and/or via the WLAN or LAN to the computing unit, in particular by the retrieving a download link, which makes reference to the memory location of the computer program product.

Features, advantages or alternative embodiments mentioned in the description of the apparatus should likewise be transferred to the method, and vice versa. In other words, claims on the method can be developed with features of the apparatus, and vice versa. In particular, the inventive apparatus can be used in the method.

FIG. 1 shows in a flowchart with steps S100 to S104 the inventive computer-implemented method for assessing a component quality of an electron emitter for assessing a component quality of an electron emitter, which is part of a cathode facility, with the cathode facility comprising a cathode head and the electron emitter inserted in the cathode head, with the electron emitter being, in particular, a flat emitter.

Method step S100 denotes receiving of an electron emitter image dataset, with items of image information of the electron emitter image dataset at least partially mapping the electron emitter inserted in the cathode head.

Method step S101 denotes receiving of an electron emitter geometry model from a memory unit. The electron emitter geometry model can be annotated with a large number of the measuring points describing electron emitter geometry.

Method step S102 denotes transforming of the received electron emitter geometry model to the items of image information of the electron emitter image dataset, with an item of electron emitter geometry information of the electron emitter being calculated as an output parameter of the transformation. Transformation takes place, in particular, while minimizing a complex correlation factor. The electron emitter geometry information can describe a spatial shift of at least one measuring point and/or a relative distance between two measuring points.

Method step S103 denotes ascertaining a degree of similarity of the inserted electron emitter with at least one further electron emitter using the electron emitter geometry information.

Method step S104 denotes assessing the component quality as a function of the ascertained degree of similarity with the at least one further electron emitter.

Figure 2:
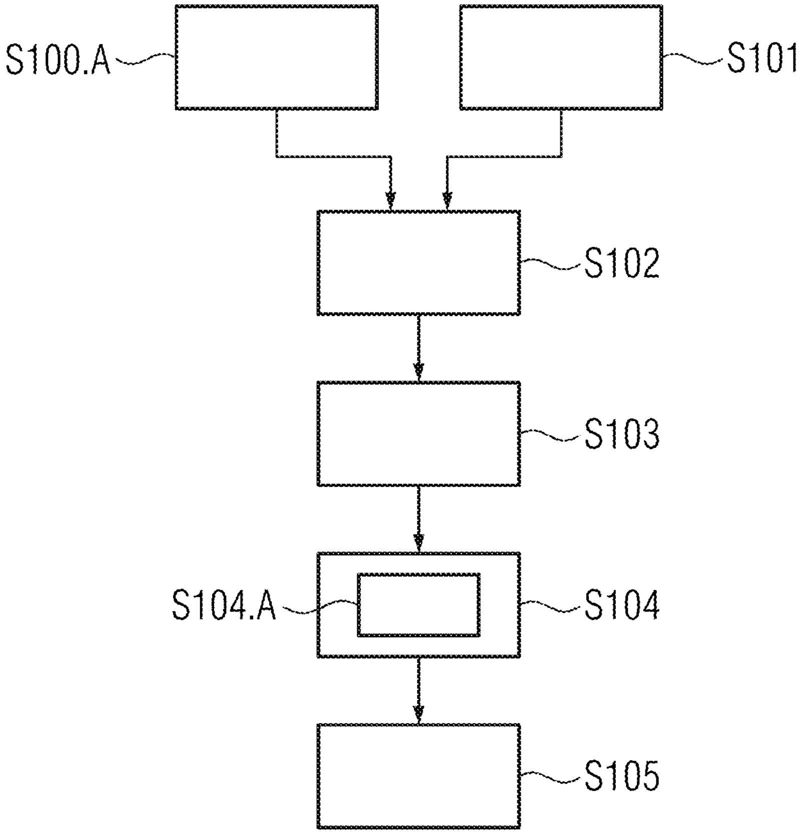
FIG. 2 shows the method in a first exemplary embodiment.

FIG. 2 shows a first exemplary embodiment of the method in a flowchart.

Method step S100.A denotes that a single electron emitter image dataset is received.

Method step S104.A denotes that the component quality of the electron emitter is assessed via the single electron emitter image dataset of the electron emitter.

Method step S105 denotes that the assessed component quality of the electron emitter is stored in a memory unit.

Figure 3:
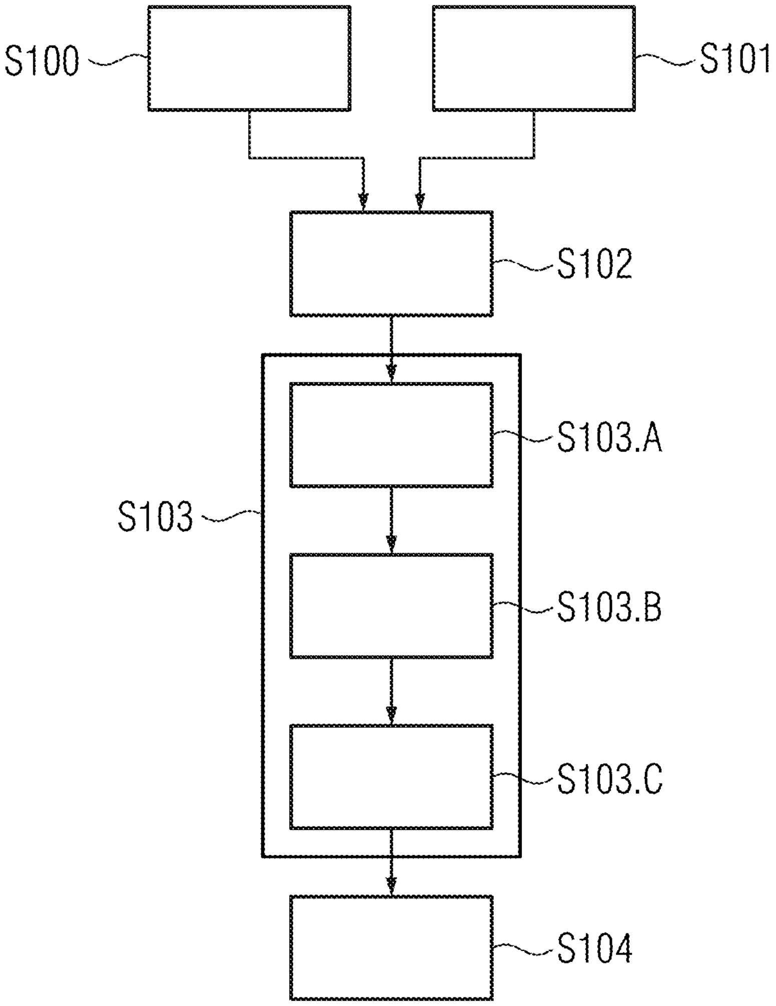
FIG. 3 shows the method in a second exemplary embodiment.

FIG. 3 shows a second exemplary embodiment of the method in a flowchart.

Method step S103.A denotes that ascertaining the degree of similarity comprises inputting the electron emitter geometry information into an AI model trained via a machine learning method and providing the degree of similarity at an output of the AI model.

Method step S103.B denotes that the input electron emitter geometry information is dimensionally reduced via the AI model and the degree of similarity is ascertained via the dimensionally reduced electron emitter geometry information.

Method step S103.C denotes that via the AI model, a first category with electron emitter geometries with an artifact are distanced from a second category with electron emitter geometries without artifact and that the degree of similarity is ascertained via an assignment of the electron emitter geometry information to the first category or the second category.

Figure 4:
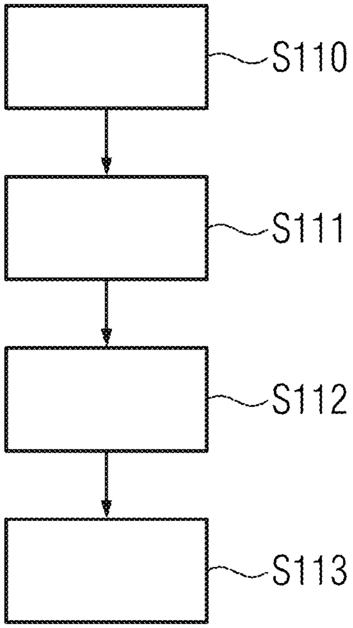
FIG. 4 shows an inventive computer-implemented method for providing a trained AI model and FIG. 5 shows an inventive cathode facility.

FIG. 4 shows in a flowchart with steps S110 to S113 an inventive computer-implemented method for providing a trained AI model.

Method step S110 denotes receiving of performance data, obtained in the field, of further electron emitters as input data. It is conceivable that, in addition, items of electron emitter geometry information of the further electron emitters are received as input data.

Method step S111 denotes applying a neural network, which comprises an encoder and a decoder, to the input data, with an output vector being calculated, with the encoder mapping a first number of input values to a second number of output values, and with the decoder mapping a second number of input values to a first number of output values, with the second number being smaller than the first number.

Method step S112 denotes adapting a parameter of the neural network on the basis of a comparison of the output vector with the input data.

Method step S113 denotes an output of the decoder as a trained AI model.

Figure 5:
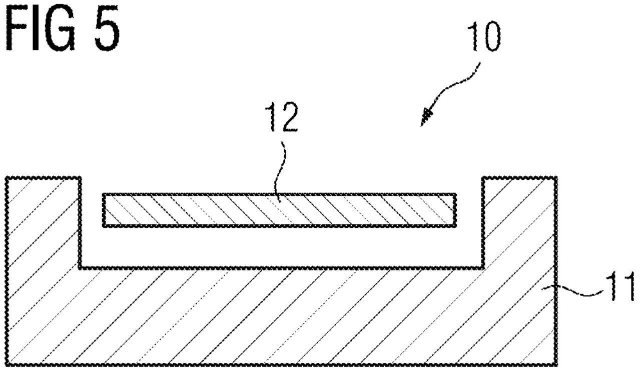

FIG. 5 shows an inventive cathode facility 10 in a schematic cross-section.

The cathode facility 10 has a cathode head 11 and an electron emitter 12 inserted in the cathode head 11. The electron emitter 12 is a flat emitter. A component quality of the electron emitter 12 is assessed with the inventive method.

The cathode facility 10 can be, in particular, part of an evacuated X-ray tube. In this case, an anode is typically arranged opposite the cathode facility 10. The electrons generated via the electron emitter 12 strike this anode if an acceleration voltage is applied between the cathode facility 10 and the anode. The X-rays are generated as the electrons interact on the anode. The X-rays can be used, in particular, in diagnostic imaging, for example computed tomography, mammography and/or angiography, or in materials testing in which attenuated X-ray profiles can be reconstructed to form an image.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element (s) or feature (s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the invention has been illustrated and described in detail by the preferred exemplary embodiments, it is nevertheless not limited by the disclosed examples and a person skilled in the art can derive other variations herefrom without departing from the scope of the invention.

The invention claimed is:

1. A computer-implemented method for assessing a component quality of an electron emitter, which is part of a cathode facility, wherein the cathode facility comprises a cathode head and the electron emitter inserted in the cathode head, the method comprising:

receiving an electron emitter image dataset, wherein items of image information of the electron emitter image dataset at least partially map the electron emitter inserted in the cathode head;

receiving an electron emitter geometry model from a memory unit;

transforming the received electron emitter geometry model to the items of image information of the electron emitter image dataset, wherein an item of electron emitter geometry information of the electron emitter inserted in the cathode head is calculated as an output parameter of the transformation;

ascertaining a degree of similarity of the electron emitter inserted in the cathode head with at least one further electron emitter by using the electron emitter geometry information; and assessing the component quality as a function of the ascertained degree of similarity with the at least one further electron emitter.

2. The method of claim 1, wherein the electron emitter image dataset is a single electron emitter image dataset and the assessing assesses the component quality of the electron emitter using the single electron emitter image dataset of the electron emitter.

3. The method of claim 1, wherein the electron emitter geometry model is annotated with a large number of measuring points describing the electron emitter geometry.

4. The method of claim 1, wherein the transforming takes place while minimizing a complex correlation factor.

5. The method of claim 1, wherein the electron emitter geometry information describes at least one of a spatial shift of at least one measuring point or a relative distance between two measuring points.

6. The method of claim 1, wherein the ascertaining the degree of similarity comprises:

inputting the electron emitter geometry information into an Artificial Intelligence (AI) model trained via a machine learning method, and providing the degree of similarity at an output of the AI model.

7. The method of claim 6, wherein the ascertaining the degree of similarity comprises:

dimensionally reducing the input electron emitter geometry information, and the ascertaining ascertains the degree of similarity via the dimensionally reduced electron emitter geometry information.

8. The method of claim 6, wherein the ascertaining the degree of similarity comprises:

distancing a first category with electron emitter geometries with an artifact from a second category with electron emitter geometries without the artifact, and the ascertaining ascertains the degree of similarity via an allocation of the electron emitter geometry information to the first category or the second category.

9. The method of claim 1, wherein the assessed component quality of the electron emitter is stored in a memory unit.

10. A computer-implemented method for providing a trained Artificial Intelligence (AI) model, the method comprising:

receiving performance data of further electron emitters as input data;

applying a neural network, which comprises an encoder and a decoder, to the input data, wherein an output vector is calculated, wherein the encoder maps a first number of input values to a second number of output values, and wherein the decoder maps a second number of input values to a first number of output values, wherein the second number is smaller than the first number;

adapting a parameter of the neural network based on a comparison of the output vector with the input data; and outputting the decoder as the trained AI model.

11. The method of claim 10, wherein the receiving further receives items of electron emitter geometry information of the further electron emitters as part of the input data.

12. A cathode facility comprising:

a cathode head; and an electron emitter inserted in the cathode head, wherein a component quality of the electron emitter is assessed with the method of claim 1.

13. The cathode facility of claim 12, wherein the electron emitter is a flat emitter.

14. A non-transitory computer-readable medium with program code means, when executed by a computing unit, cause the computing unit to perform the method of claim 1.

15. The method of claim 2, wherein the electron emitter geometry model is annotated with a large number of measuring points describing the electron emitter geometry.

16. The method of claim 2, wherein the transforming takes place while minimizing a complex correlation factor.

17. The method of claim 2, wherein the electron emitter geometry information describes at least one of a spatial shift of at least one measuring point or a relative distance between two measuring points.

18. The method of claim 2, wherein the ascertaining the degree of similarity comprises:

inputting the electron emitter geometry information into an Artificial Intelligence (AI) model trained via a machine learning method, and providing the degree of similarity at an output of the AI model.

19. The method of claim 18, wherein the ascertaining the degree of similarity comprises:

dimensionally reducing the input electron emitter geometry information, and the ascertaining ascertains the degree of similarity via the dimensionally reduced electron emitter geometry information.

20. The method of claim 18, wherein the ascertaining the degree of similarity comprises:

distancing a first category with electron emitter geometries with an artifact from a second category with electron emitter geometries without the artifact, and the ascertaining ascertains the degree of similarity via an allocation of the electron emitter geometry information to the first category or the second category.

* * * * *